July 31, 1951     L. D. ELLSWORTH ET AL     2,562,305
SAW TOOTH WAVE GENERATOR
Filed Feb. 17, 1950
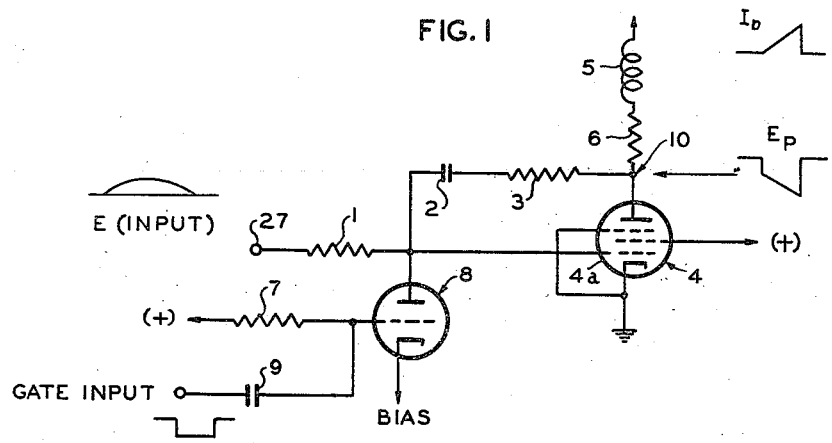
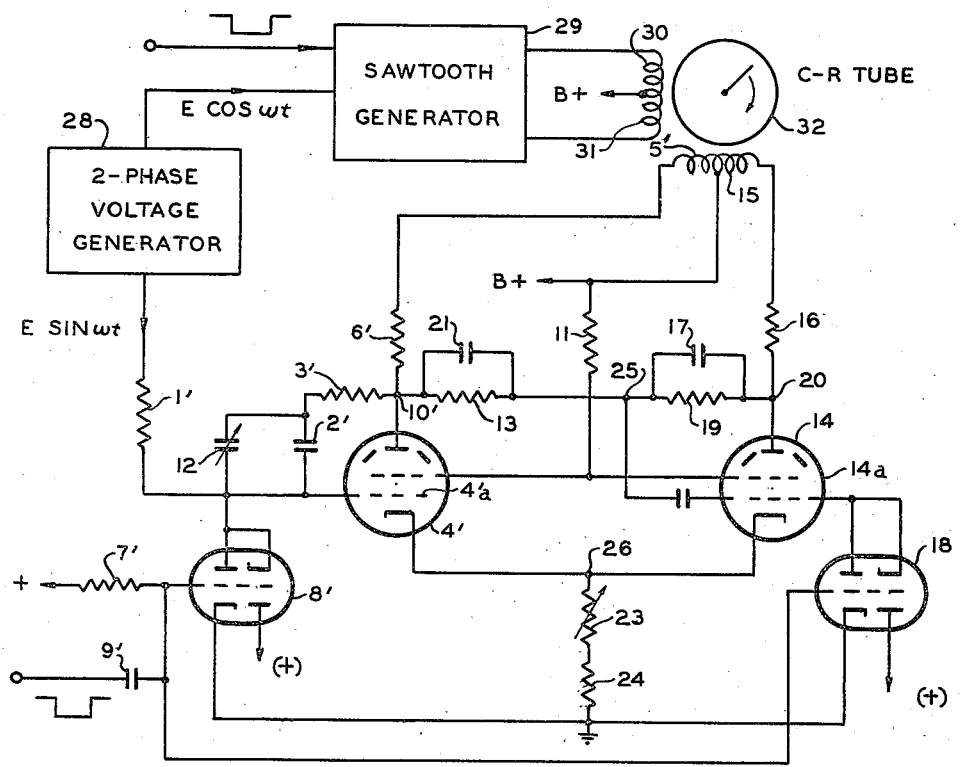
INVENTOR.
LOUIS D. ELLSWORTH
CLAYTON A. WASHBURN
BY
*Harry M. Saragovitz*
Attorney Patented July 31, 1951

2,562,305

UNITED STATES PATENT OFFICE 2,562,305

SAW-TOOTH WAVE GENERATOR

Louis D. Ellsworth, Manhattan, Kans., and Clayton A. Washburn, Chicago, Ill., assignors, by mesne assignments, to the United States of America as represented by the Secretary of the Army Application February 17, 1950, Serial No. 144,787

10 Claims. (Cl. 315—24)

The invention described in the following specification and claims may be manufactured and used by or for the Government for governmental purposes without the payment to us of any royalty thereon.

This application is a continuation-in-part of application Serial No. 611,654 filed August 20, 1945.

The invention relates to an electric circuit for generating a voltage to produce a linear sweep of the electron beam in a cathode ray oscilloscope.

In oscilloscopes used in radio direction and ranging systems, it is particularly important to have a linear sweep to cause the electron beam to move across the screen at a constant speed during the period of the sweep. This problem is complicated when a fast sweep is desired in an oscilloscope using magnetic deflection for the electron beam. It has been found necessary, when magnetic deflection is used, to generate a trapezoidal voltage waveform in which an initial very steep rise of voltage charges the distributed capacitance in the circuit and overcomes the large inductance of the magnetic deflection coils, so as to start the sweep quickly.

One form of oscilloscope presentation with which this invention is particularly adapted to be used is the so-called PPI (plan position indication) scan. In this type of presentation, the beam starts at the center of the oscilloscope screen, travels radially outward at a constant speed, then very rapidly returns to the center, and at the same time is rotated around the screen (like the spoke of a wheel) at a much slower rate than the sweep itself travels, so that very many radial sweeps occur in one complete revolution around the screen.

PPI oscilloscopes are generally provided with one pair of deflection coils. These deflection coils are connected in series and arranged on opposite sides of the throat of the cathode ray tube. The coils produce magnetic fluxes in the same direction, so that the coils are additive in their production of a magnetic field and equivalent to a single coil. The deflection coil assembly is mounted for rotation about the axis of the cathode ray tube. The assembly is usually driven by a servo motor which is energized by a servo amplifier. The servo motor also drives one or more self-synchronous generators having their stators energized by tracking voltages and their outputs providing the "error signals" for the servo amplifier. Since the deflection coils rotate, it is necessary to provide them with accurate ball bearing races, ring gears, an adjustable centering mounting, slip rings, and contact arms connected to the slip rings. A complex mounting is required for the coil assembly, motor, generators, and the gear trains interconnecting these elements. This conventional arrangement is quite complex, expensive, and has serious operating limitations. It is therefore one of the objects of this invention to provide a simple, compact, inexpensive arrangement for producing the rotating sweep required for a PPI presentation.

Another object of this invention, therefore, is to provide a linear sweep circuit, which can be accurately synchronized with other circuits, to provide a PPI presentation on an oscilloscope screen.

A further object of the invention is to provide a linear sweep generator for energizing deflection coils for pushpull operation.

It is another object of this invention to produce a linear sweep current or voltage whose amplitude will vary at a very low frequency sinusoidal rate.

It is still another object of this invention to produce two linear sweep voltages or currents whose amplitudes vary sinusoidally and cosinusoidally, respectively, so that they may be impressed on a pair of mutually perpendicular deflection elements of a cathode ray tube to produce a PPI presentation.

It is a still further object of this invention to provide a relatively simple circuit for producing highly linear rotating sweeps with fixed deflection coils.

Other objects and advantages will become readily apparent from the hereinafter described specification.

The linear sweep is generated by a vacuum tube. The anode of the tube is connected through the deflecting coil to a source of positive potential. The grid is connected to the anode by means of a resistor and capacitor in series. The grid is also connected through a resistor to a terminal at which a modulating potential (usually a low frequency sine wave) is applied. The grid is held at a predetermined fixed potential by a clamp or switch tube at all times, except during the period that a sweep is being generated, at which time it is released by means of a negative gate voltage applied to the grid clamp tube. Once the grid is released, the charge on the capacitor will change at a rate determined by the potential at the input terminal, the value of the series resistor, the size of the capacitor and feedback from anode to grid. It has been found that the change in potential at the anode is very linear, due to the negative feedback to the grid. Pushpull operation can be obtained by using a second tube as a paraphase inverter and coupling it to the first tube by any suitable means, such as a common unbypassed cathode resistor. A PPI type presentation may be obtained by using a second similar sweep generator for a second set of coils with the sine wave input voltage 90° out of phase with the input voltage on the first sweep generator.

In the drawing:

Fig. 1 illustrates a simplified form of a linear sweep circuit for exemplifying some of the principles of operation of the circuit.

Fig. 2 is a circuit diagram of a preferred embodiment of the invention.

Referring now to Fig. 1, tube 4 is a multigrid tube which is used as a sweep generating tube. The control grid 4a of this tube is clamped to a reference potential by clamp tube 8, which acts merely as a switch. A cycle of sweep voltage is initiated by applying a negative gating pulse, through a blocking capacitor 9, to the grid of clamp tube 8. The grid of the clamp tube is normally positive since it is connected to a positive potential through resistor 7. The cathode is connected to a suitable bias potential or ground. The slope of the sweep voltage is determined by the rate at which capacitor 2 charges. The slope is therefore dependent on the voltage applied at terminal 27, the value of capacitor 2 and the value of resistor 1. Resistor 3 has little or no effect on the charging rate. If resistor 3 is omitted, the initial sharp rise of the voltage Ep does not occur and the resultant wave shape is suitable for use in a cathode ray tube using electrostatic deflection.

In order to produce a sweep whose slope changes slowly in a desired manner, a voltage varying in the same manner is applied to input terminal 27. This input voltage, shown as a half of a sine wave, varies so slowly that it is substantially constant during a single sweep. It has been found that this circuit produces a very linear sweep due to the feedback action from the anode to the grid through the resistor 3 and capacitor 2.

The coil 5 represents the deflection coil of the oscilloscope and is shown as a single coil for simplicity, although usually there are two coils connected to reinforce each other. The voltage waveform existing at point 10 is the trapezoidal voltage waveform Ep referred to above. The current flowing through the deflection coil is shown directly above the voltage waveform and is labeled Id. It should be noticed that the current through the coil 5 starts immediately at a uniform rate due to the initial sharp rise of voltage.

A linear sweep circuit similar to the one shown in Fig. 1 is disclosed in the application of Clayton A. Washburn, Serial No. 514,536, entitled "Linear Sweep Circuits," filed December 16, 1943.

Referring now to Fig. 2, there is shown a circuit embodying the principle of the circuit of Fig. 1. This circuit is adapted to energize two pairs of pushpull deflection coils for producing a PPI presentation. When the tubes are balanced, the net flux produced by the pushpull deflecting coils is zero, and this permits the beam to remain in the center of the screen of the cathode ray tube when a sweep is not being generated.

The tubes 4' and 14 of Fig. 2 are shown as beam power tubes, although triodes or pentodes could also be used. Tube 4' has its grid 4'a connected through resistor 1' to a source 28 of sine wave voltage. The plate of tube 4' is connected through resistor 6' and deflection coil 5' to a source of B+ voltage. The plate of tube 4' also has a feedback connection to grid 4'a consisting of resistor 3' and condenser 2'. A small adjusting condenser 12 is connected in parallel to condenser 2'. The grid 4'a also has connected to it a clamping or switch tube 8'. The clamping tube 8' may be a twin triode, as shown, with the two triode sections connected oppositely. The grids of tube 8' are connected to a source of positive potential through a resistor 7' which normally maintains tube 8' conductive and thereby holds the grid 4'a at a fixed reference potential. The cathode of one triode section of tube 8' may be grounded, while the plate of the other triode section is connected to a suitable positive potential source. A condenser 9' is connected to the grids of tube 8' and provides a means for impressing negative gating pulses on these grids for rendering tube 8' nonconductive.

A second tube 14 has its cathode connected to the cathode of tube 4' and both cathodes are connected to ground through variable resistor 23 and fixed resistor 24. The grid 14a is connected through blocking condenser 22 to a point 25 between resistors 13 and 19. Resistors 13 and 19 are shunted by condensers 21 and 17, respectively, and are connected in series between the plates of tubes 4' and 14. The screen grids of tubes 4' and 14 are connected together and supplied with B+ potential through resistor 11. The plate of tube 14 is connected through resistor 16 and deflection coil 15 to the source of B+ potential. A clamp or switching tube 18 similar to the clamp tube 8' is connected to grid 14a. The grids of tube 18 are connected to the grids of tube 8'. The deflection coils 5' and 15 are connected in pushpull so that their magnetic fluxes are in opposite directions and the resultant flux of the two coils is zero when the currents therethrough are equal.

The circuit of Fig. 2 as so far described functions as follows: The circuit elements in this figure whose reference numerals are shown with primes correspond exactly in function to the circuit elements with the same numeral in Fig. 1. Tube 4' acts as the sweep generating tube. The waveform at point 10' is exactly the same as the waveform produced at point 10 in Fig. 1. Grid 14a of tube 14 is driven by tube 4' in such a manner that the voltage variations at point 20 are substantially equal and 180° out of phase with the variations at point 10'. Tube 14 is coupled to tube 4' by means of the common, unbypassed cathode resistors 23 and 24 and by connecting the grid 14a of tube 14, through a blocking capacitor 22, to the point 25 between resistors 13 and 19. The capacitors 17 and 21 improve the waveform at the anode of tube 14 by quickly transmitting small unbalances of potential to point 25. The bias on tube 14, after the negative gate pulse has released its grid, depends on the variation in potential between points 25 and 26. If the variations in potential at the anode of tube 14 are exactly equal and opposite to the variations in potential at the anode of tube 4' the potential at point 26 will not vary, and the potential at point 25 will not vary if resistor 13 is equal to resistor 19. If resistor 13 is smaller than resistor 19, the point 25 will vary in potential even when the tubes are in step and, if the resistors are properly proportioned, will provide sufficient driving voltages on the grid of tube 14 to make its anode voltage variation substantially equal and opposite to that of the anode of tube 4'. On the other hand, if the variations at the anode of tube 14 are not equal and opposite to those at the anode of tube 4', the potential at points 25 and 26 will vary in such a way as to change the bias on tube 14 to bring this tube into such balance with tube 4'.

For example, if the current through tube 4' increased more than the current through tube 14 decreased, the voltage at point 26 would rise. This is equivalent to making the bias on grid of tube 14 less positive and would therefore decrease the current flowing through tube 14. This same variation in plate currents would also affect the potential at point 25 since a fall in potential at point 10' not accompanied by an equal rise at point 20 would cause the potential at point 25 to fall. This would create a less positive bias on tube 14 and would cause the potential at point 20 to rise.

The coils 5' and 15 shown in this figure represent the two parts of the deflection coil in a PPI oscilloscope. When a negative gating voltage is not impressed on the grids of clamp tubes 8' and 18, the current in coil 5' will be equal to the current in coil 15 and if the coils are connected in opposition, no net flux will be produced and no deflection of the beam will take place. The variable cathode resistor 23 is used to control the bias on tubes 4' and 14. The variable capacitor 12, by changing the time constant of the charging circuit, will control the slope of the voltage waveform and therefore can be used to control the amount the beam is displaced during the period of the sweep.

In order to vary the amplitudes of the currents through coils 5', 15 at a sinusoidal rate, a sinusoidal voltage is impressed on the grid 4'a from alternating current voltage generator 28 through resistor 1'. Since the amplitude of the current and voltage of the sawtooth waves produced by tubes 4' and 14 is determined by the difference of potential between the plate and grid of tube 4', the outputs of these tubes will vary in accordance with the sinusoidal voltage impressed on the grid of tube 4'. The tubes 8' and 18 are shown as twin triodes, one half of each triode being reversed with respect to the other half. This is necessary in order to permit the switching tubes 8' and 18 to conduct and connect grids 4'a and 14a to a reference potential when no gating pulse applied to tubes 8' and 18. For this purpose, each switching tube has one cathode and one anode connected to grids 4'a and 14a, respectively. The other anodes of tubes 8' and 18 are connected to a source of positive potential, while the other cathodes are shown grounded.

A PPI presentation may be obtained with this circuit by connecting an identical sawtooth generator circuit 29, triggered by the same negative gating pulse, to the other set of deflecting coils 30, 31, and feeding to sawtooth generator 29 an input voltage $E \cos wt$, which is 90° out of phase with the $E \sin wt$ voltage applied to the sawtooth generator supplying the first deflection coils 5' and 15. The deflection coils 30, 31 are arranged to produce a magnetic field perpendicular to the field produced by coils 5', 15, and since the amplitudes of these two magnetic fields are also modulated in phase quadrature, the envelope of the sweep currents in coils 5', 15 varying as $\sin wt$ and the envelope of the sweep currents in coils 30, 31 varying as $\cos wt$, the two magnetic fields will combine to produce a rotating linear sawtooth sweep of constant amplitude. This is precisely the type of sweep required for a PPI presentation.

It will be understood that various combinations of elements can be utilized in our circuits to perform the required functions. However, in order to more specifically teach the practice of our invention, the following are given as an example of one set of values of the components in the circuit of Fig. 2. These values are designed to produce a sweep having a 5-mile minimum range, using a cathode ray tube having an anode voltage of 7000 volts and a sweep frequency repetition rate of 1000 C. P. S.

| Component No. | Value |
| --- | --- |
| 1' | 1 Megohm. |
| 2' | 125 μμf. for 5 miles sweep (is proportional to range). |
| 3' | .51 Megohm for 5 miles sweep (is inversely proportional to range). |
| 4' 14 | 6L6 tubes. |
| 5', 15 and 30, 31 | 1100 turn pushpull square core deflection coil. |
| 6', 16 | 2000 ohms (including coil resistance). |
| 7' | 1 Megohm. |
| 8', 18 | 6SN7 tubes. |
| 9' | .05 μf. |
| 11 | 24,000 ohms. |
| 13 | 100,000 ohms. |
| 17 | 1 μf. |
| 19 | 120,000 ohms. |
| 21 | 2.5 μμf. |
| 22 | 1000 μμf. |
| 23 | 50 ohms. |
| 24 | 180 ohms. |
| 26 | +18 volts approximately. |
| 28 | +150 volts peak sine or cosine wave. |
| B+ | 330 volts D. C., @ 100 milliamperes. |
| Gating Pulse | 25 volts approximately. |
| Clamp Tube Supply | 150 volts D. C. |

It will be apparent that there may be deviations from the invention as specifically described which still fall fairly within the spirit and scope of the invention. For example, the circuits may be modified for use with an oscilloscope having electrostatic deflection by omitting resistor 3 or 3' and thus generating a simple sawtooth instead of a trapezoidal waveform in addition any desired waveform could be applied to the input terminal to modulate the sweep.

Accordingly, we claim all such deviations which fall fairly within the spirit and scope of the invention as identified in the hereinafter appended claims:

1. A sweep current generator comprising the following apparatus, a first vacuum tube having an anode, a cathode and at least one grid, a condenser connected between the anode and grid, a second vacuum tube similar to the first tube, resistance means connecting the anode of said second tube to the anode of said first tube, a condenser connecting the control grid of said second tube to said resistance means near the midpoint thereof, means for maintaining the grids of the first and second tubes at a reference potential, means for disconnecting said grids from said reference potential at the beginning of the generation of a sweep current, a common unbypassed cathode resistor electrically connected at one end to the cathodes of said first and second vacuum tubes and having its other end connected to ground, a source of positive potential, and a load connected between each of said anodes and said source of positive potential.

2. A sweep current generator in accordance with claim 1 in which said resistance means is shunted by capacitive means.

3. A sweep current generator as defined in claim 1 including means for impressing a sinusoidal voltage between the grid and cathode of the first tube to thereby vary the amplitudes of the sweep currents sinusoidally.

4. A cathode ray tube deflection circuit for generating two interrelated linear sweep currents which are adapted to produce a rotating sweep on a cathode ray oscilloscope, including a first sweep generator and a second sweep generator, each comprising the apparatus defined in claim 1, means for sinusoidally modulating the sweep voltage output of the first sweep generator, means for cosinusoidally modulating the sweep voltage output of said second sweep generator, and in which the last mentioned means of claim 1 simultaneously triggers the first and second sweep generators to initiate the sweeps.

5. A pushpull sweep generator comprising a sweep current generating circuit including a first vacuum tube, a paraphase inverter including a second vacuum tube, said tubes each having an anode, grid, and having interconnected cathodes, resistance means connecting the anode of said second tube to the anode of the said first tube, a capacitor shunting said resistance means, means connecting the grid of said second tube to an intermediate point of said resistance means, and a load impedance electrically connected between each of said anodes and a common source of positive potential, whereby the currents through said load impedances are in pushpull relationship.

6. The pushpull sweep generator defined in claim 5 wherein the load impedances are the two halves of a cathode ray tube deflection coil connected so that their magnetic fields are in opposition.

7. The pushpull sweep generator defined in claim 6 including means for varying the amplitude of the sweep current of the sweep current generating circuit sinusoidally.

8. A cathode ray tube deflection circuit including a pair of pushpull sweep current generators each as defined in claim 6, means for varying the amplitude of the sweep current of one of said sweep current generators sinusoidally, and means for varying the amplitude of the sweep current of the other sweep current generator cosinusoidally.

9. A sweep voltage generator comprising a first vacuum tube having an anode, a cathode and at least one grid, a condenser connected between the anode and grid, means for varying the potential of said grid as a function of time for modulating the sweep voltage, a second vacuum tube similar to the first tube, resistance means connecting the anode of said second tube to the anode of said first tube, a condenser connecting the control grid of said second tube to said resistance means near the midpoint thereof, means for maintaining the grids of the first and second tubes at a reference potential, means for disconnecting said grids from said reference potential at the beginning of the generation of a sweep voltage, means for impressing a portion of the output voltage of the first tube between the grid and cathode of the second tube, a source of positive potential, and a load impedance connected between each of said anodes and said source of positive potential.

10. A sweep voltage generator comprising first and second vacuum tubes each having an anode, a cathode and at least one grid, a condenser connected between the anode and grid of said first tube, resistance means connecting the anode of said second tube to the anode of said first tube, a condenser connecting the control grid of said second tube to said resistance means near the midpoint thereof, means for maintaining the grids of the first and second tubes at a reference potential, means for disconnecting said grids from said reference potential at the beginning of the generation of a sweep voltage, means for impressing a portion of the output voltage of the first tube between the grid and cathode of the second tube, a source of positive potential, a load impedance connected between each of said anodes and said source of positive potential, and means for impressing a sinusoidal voltage between the grid and cathode of the first tube, whereby the voltages across the load impedances are in pushpull relation and vary in amplitude sinusoidally.

LOUIS D. ELLSWORTH.
CLAYTON A. WASHBURN.

REFERENCES CITED

The following references are of record in the file of this patent:

UNITED STATES PATENTS

| Number | Name | Date |
| --- | --- | --- |
| 2,313,966 | Poch | Mar. 16, 1943 |
| 2,395,966 | Goldberg | Mar. 5, 1946 |
| 2,436,890 | Higinbotham | Mar. 2, 1948 |
| 2,464,274 | Todd | Mar. 15, 1949 |